United States Patent
Chen et al.

(10) Patent No.: US 7,808,999 B2
(45) Date of Patent: *Oct. 5, 2010

(54) METHOD AND APPARATUS FOR OUT-OF-ORDER PROCESSING OF PACKETS USING LINKED LISTS

(75) Inventors: Edmund G. Chen, Sunnyvale, CA (US); John G. Favor, Scotts Valley, CA (US); Ruchi Wadhawan, Sunnyvale, CA (US); Gregory G. Minshall, Berkeley, CA (US)

(73) Assignee: Ericsson AB, Stockholm (SE)

( * ) Notice: Subject to any disclaimer, the term of this patent is extended or adjusted under 35 U.S.C. 154(b) by 125 days.

This patent is subject to a terminal disclaimer.

(21) Appl. No.: 12/054,235

(22) Filed: Mar. 24, 2008

(65) Prior Publication Data

US 2008/0259928 A1 Oct. 23, 2008

Related U.S. Application Data

(63) Continuation of application No. 10/327,555, filed on Dec. 20, 2002, now Pat. No. 7,349,399.

(60) Provisional application No. 60/412,433, filed on Sep. 20, 2002.

(51) Int. Cl.
*H04L 12/56* (2006.01)
*H04L 12/54* (2006.01)
*G06F 9/44* (2006.01)

(52) U.S. Cl. .................. 370/394; 370/429; 712/245

(58) Field of Classification Search ............... None
See application file for complete search history.

(56) References Cited

U.S. PATENT DOCUMENTS

| 4,901,233 | A | 2/1990 | Liptay |
| 5,197,132 | A | 3/1993 | Steely, Jr. et al. |
| 6,327,625 | B1 | 12/2001 | Wang et al. |

(Continued)

OTHER PUBLICATIONS

White Paper, "Building Next Generation Network Processors," Apr. 2001, 14 pages Agere Systems.

(Continued)

*Primary Examiner*—Gregory B Sefcheck
(74) *Attorney, Agent, or Firm*—Blakely, Sokoloff, Taylor & Zafman LLP

(57) ABSTRACT

These and other aspects of the present invention will be better described with reference to the Detailed Description and the accompanying figures. A method and apparatus for out-of-order processing of packets using linked lists is described. In one embodiment, the method includes receiving packets in a global order, the packets being designated for different ones of a plurality of reorder contexts. The method also includes storing information regarding each of the packets in a shared reorder buffer. The method also includes for each of the plurality of reorder contexts, maintaining a reorder context linked list that records the order in which those of the packets that were designated for that reorder context and that are currently stored in the shared reorder buffer were received relative to the global order. The method also includes completing processing of at least certain of the packets out of the global order and retiring the packets from the shared reorder buffer out of the global order for at least certain of the packets.

21 Claims, 12 Drawing Sheets

U.S. PATENT DOCUMENTS

| | | | |
|---|---|---|---|
| 6,601,150 B1 * | 7/2003 | Scheinbart et al. | 711/156 |
| 6,781,992 B1 | 8/2004 | Rana et al. | |
| 6,876,657 B1 * | 4/2005 | Brewer et al. | 370/394 |
| 6,981,110 B1 * | 12/2005 | Melvin | 711/154 |
| 7,072,342 B1 | 7/2006 | Elnathan | |
| 7,088,719 B2 | 8/2006 | Brown et al. | |
| 7,240,347 B1 * | 7/2007 | Lim et al. | 718/100 |
| 7,248,586 B1 * | 7/2007 | Hughes et al. | 370/394 |
| 7,251,246 B2 * | 7/2007 | Ross | 370/394 |
| 7,333,502 B2 * | 2/2008 | Henderson et al. | 370/429 |
| 7,349,398 B1 * | 3/2008 | Favor et al. | 370/394 |
| 7,349,399 B1 * | 3/2008 | Chen et al. | 370/394 |
| 7,486,678 B1 * | 2/2009 | Devanagondi et al. | 370/394 |
| 7,512,129 B1 * | 3/2009 | Favor et al. | 370/394 |
| 2003/0053461 A1 | 3/2003 | Ross | |
| 2005/0089038 A1 | 4/2005 | Sugai et al. | |
| 2006/0007871 A1 * | 1/2006 | Welin | 370/252 |

OTHER PUBLICATIONS

EE Times—Selecting an appropriate programming model, Larry Huston, http://www.eetimes.com/in_focus/embedded_system/OEG20020802S0036, Feb. 24, 2003.

* cited by examiner

METHOD AND APPARATUS FOR OUT-OF-ORDER PROCESSING OF PACKETS USING LINKED LISTS

CROSS-REFERENCE TO RELATED APPLICATIONS

The present application is a continuation of application Ser. No. 10/327,555, filed Dec. 20, 2002, now issued as U.S. Pat. No. 7,349,399, which claims priority to the provisional filed application entitled METHOD AND APPARATUS FOR OUT-OF-ORDER PROCESSING OF PACKETS USING LINKED LISTS, filed on Sep. 20, 2002, Ser. No. 60/412,433, which is also incorporated herein by reference.

FIELD OF THE INVENTION

The invention relates to the field of networking. More specifically, the invention relates to out-of-order packet processing.

BACKGROUND OF THE INVENTION

A network element for routing packets (e.g., Internet Protocol ("IP") packets, Ethernet packets, etc.) typically includes a number of slots for receiving line cards. Each line card has one or more ports for connecting media on which packets can be received. In order to process the packets, the network element will include one or more packet processors. For example, each line card will include one or more packet processors.

A packet processor on a line card that processes packets coming into the network element (an ingress or egress packet processor) will typically be processing packets from several different "micro-flows" at a time. A micro-flow describes all of the packets transmitted from the same address and port to the same destination address and port as part of an exchange of information between two applications during a given time period (e.g., a Transmission Control Protocol session). While packet protocols (such as the IP packet protocol) allow the destination to correct for the reception of out-of-order packets from a given micro-flow, such correction slows performance. Thus, many network elements are designed to prevent packet reordering by ensuring that the packets of a given micro-flow received on the same interface are transmitted out of the network element in the order in which those packets were received by the network element.

One packet processor design includes multiple execution units and scheduling/reordering software. The scheduling/reordering software, running on one or more of the execution units, is used to control the processing of the packets being received by the packet processor. This software operates such that the order in which the packets are transmitted out of the packet processor is the same as the order in which they were received (referred to herein as "globally" in order), but allows, to a certain extent, the packets to be processed out-of-order. The global ordering ensures that the ordering of the packets of a given micro-flow received on a given interface is maintained, while the out-of-order processing between unrelated micro-flows allows for improved performance.

In particular, the software (executing on the multiple execution units) maintains a separate queue for each slot/line card. The software assigns each incoming packet (based on the packet's header) to the queue for the line card over which that packet will be transmitted out of the network element. Therefore, the packets from a given micro-flow received at a given interface will all be assigned to the same queue, and multiple micro-flows are typically assigned to the same line card queue. When an execution unit is freed up for processing another packet, the software determines from which line card queue the next packet is selected for processing. In addition, the software tracks the order in which the packets are removed from each queue. Once the packet has been processed, the packets are placed on a completed line card processing queue which maintains the original order assigned of the line card queue. This ensures that the processed packets of a micro-flow queue can be made to exit the packet processor in the same order as they were received.

One disadvantage of this packet processor design is that the scheduling/reordering software requires a relatively large amount of the processing power provided by the execution units of the packet processor. Another disadvantage of this packet processor design is that although different packets take different amounts of time to process, the packets must exit the packet processor in the order in which they were received (due to the global ordering). As a result, a packet that is taking a relatively significant amount of time to process can prevent later received, but already processed packets from exiting the packet processor.

SUMMARY OF THE INVENTION

A method and apparatus for out-of-order processing of packets using linked lists is described. In one embodiment, the method includes receiving packets in a global order, the packets being designated for different ones of a plurality of reorder contexts. The method also includes storing information regarding each of the packets in a shared reorder buffer. The method includes for each of the plurality of reorder contexts, maintaining a reorder context linked list that records the order in which packets that were designated for that reorder context relative to the global order. The method also includes completing processing of at least certain of the packets out of the global order and retiring the packets from the shared reorder buffer out of the global order for at least certain of the packets. These and other aspects of the present invention will be better described with reference to the Detailed Description and the accompanying figures.

BRIEF DESCRIPTION OF THE DRAWINGS

The invention may best be understood by referring to the following description and accompanying drawings that are used to illustrate embodiments of the invention. In the drawings.

DETAILED DESCRIPTION

A method and apparatus for out-of-order packet processing are described. In the following description, numerous specific details are set forth to provide a thorough understanding of the invention. However, it is understood that the invention may be practiced without these specific details. In other instances, well-known circuits, structures, and techniques have not been shown in detail in order not to obscure the invention.

Overview

In one embodiment, packets entering the packet processor in a particular global order are associated with different reorder contexts, processed irrespective of the global order, and reordered to exit the packet processor in order with regard to their reorder context, but without regard to the global order. The number of reorder contexts is implementation dependent (e.g., the number of reorder contexts could equal the number of slots in the network element, the number of reorder context could be a number chosen so as to maximize throughput for a given implementation, such as 1024, etc.) Depending on the number of reorder contexts implemented, multiple micro-flows can be associated to the same reorder context. Typically in this case, the micro-flows will have common attributes such as the amount of processing required and/or the destinations.

Packets are referred to herein as either in-flight or out-of-flight. Packets are considered "in-flight" when they are being processed or are being stored for reordering. Otherwise, packets are considered "out-of-flight." In-flight packets have several numbers assigned to them for use in the reordering process; specifically each packet is assigned a reorder context identifier, and a reorder buffer entry address.

Figure 1:
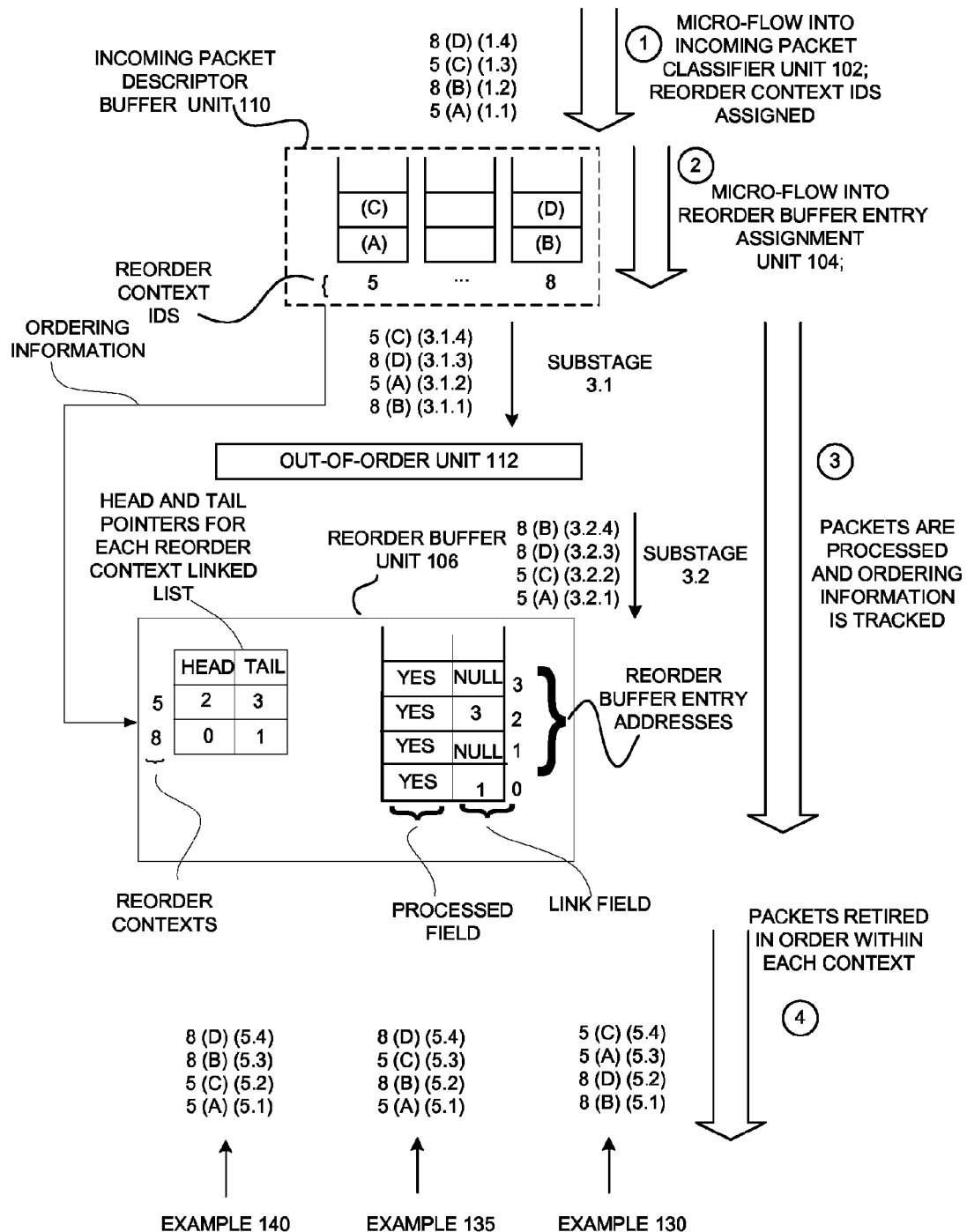
FIG. 1 is a conceptual data flow diagram illustrating the processing of several packets according to embodiments of the invention.

FIG. 1 is a conceptual data flow diagram illustrating the processing of several packets according to embodiments of the invention. In particular, FIG. 1 illustrates several exemplary flows of four packet descriptors labeled A, B, C, and D. A packet descriptor is data by which components track and access the actual packet for processing. In certain embodiments, a packet descriptor, as opposed to the packet itself, is used for tracking a packet for purposes of reordering since the entire packet is not needed (the packet itself is stored in memory). While the global order of the packet descriptors are illustrated with the labels A-D, such a global receipt position is not tracked by certain embodiments of the invention.

FIG. 1 includes a series of numbered descending arrows that depict stages in the flow of the four packets. Each of these stages in FIG. 1 will be referred to herein as "stage 1," "stage 2," etc. The order in which the packet descriptors are provided from stage to stage is indicated by decimal and second numeral following the operation number, e.g., "1.1," "1.3," etc. While a given packet descriptor flows through each of these stages, it should be understood that each of the packet descriptors need not flow through these stages and/or from stage to stage together (but can flow through different stages and pass from stage to stage at different times). Several units will be referred to in FIG. 1 (e.g., out-of-order unit 112, reorder unit 114, etc.) that will be discussed in more detail in connection with later Figures.

At stage 1, the four packet descriptors A-D are received by an incoming packet classifier unit 102 in a global order, where this global order is indicated by the order of the letters labeling these descriptors (as well as the labels 1.1, 1.2, 1.3, and 1.4). Each out-of-flight packet descriptor is assigned a reorder context identifier that identifies the reorder context with which the out-of-flight packet is associated. Specifically, the out-of-flight packet descriptors A and C are associated with reorder context 5, while descriptors B and D are associated with reorder context 8. While the example in FIG. 1 shows only two reorder contexts, it is understood there may exist any number of reorder contexts, e.g., 1024.

At stage 2, the out-of-flight packet descriptors are stored in an incoming packet descriptor buffer unit 110. While various implementations are discussed later herein, FIG. 1 shows that the incoming packet descriptor buffer unit 110 includes a buffer for each reorder context (5 and 8, in the example illustrated).

At stage 3, packets are processed and ordering information is tracked. During Stage 3, packet descriptors are transmitted twice. For purposes of illustration, the first transmission is said to occur at "substage 3.1" and the second at "substage 3.2," as shown in FIG. 1. Various embodiments can handle these operations in a variety of orders as described later herein. As part of packet processing, at substage 3.1 the packet descriptors are transmitted to the out-of-order unit 112, where the corresponding packets are processed. The packet descriptors are transmitted to the out-of-order unit 112 via a scheduling algorithm. The out-of-order unit 112 represents any circuitry for handling the packets identified by the packet descriptors, including multiple execution units to access and process the packets identified by the packet descriptors. While any number of well known or later developed scheduling algorithms can be used, in one embodiment the scheduling algorithm schedules in a round-robin format, whereby it schedules one packet descriptor from each reorder context before scheduling another packet descriptor from the same reorder context.

As illustrated in the example of FIG. 1, at substage 3.1, the packet descriptors are scheduled for processing and transmitted in the order B, A, D, and C as indicated by the labels 3.1.1, 3.1.2, 3.1.3, and 3.1.4. It should be understood that the order of provision of the packet descriptors to the out-of-order unit 112 is exemplary, and thus other orders are within the purview of the invention. In addition, while in the example of FIG. 1 one packet descriptor is provided to the out-of-order unit 112 at a time, alternative embodiments allow for more than one at a time.

At substage 3.2, the in-flight packet descriptors are transmitted from the out-of-order unit 112 to the reorder unit 114 in an order. While any number of different orders is possible, FIG. 1 shows the order A, C, D, and B to illustrate that embodiments of the invention do not require that the in-flight packet descriptors be completed in the order that they were received (see 3.2.1, 3.2.2, 3.2.3, and 3.2.4). For example, a given packet descriptor associated with a given reorder context and globally received after a different packet descriptor (from the same or a different reorder context) can be completed before that different packet descriptor. As another example, a given packet descriptor associated with a given reorder context and globally received after a different packet descriptor from a different reorder context can be completed before that different packet descriptor even enters stage 3.

Thus, it should be evident that in-flight packet descriptors from different reorder contexts may enter stage 3 out of the global order with respect to other reorder contexts and that different in-flight packet descriptors may each require different amounts of processing time.

As previously indicated, ordering information is also tracked as part of stage 3. Tracking ordering information includes reserving an entry in the reorder buffer unit 106 for each packet descriptor that is transmitted to the out-of-order unit 112, and sending packet ordering information to that entry. The ordering information can include any information associated with the entry's corresponding packet (e.g., the packet's reorder context identifier). Each reorder context is associated with a reorder context linked list, which tracks the order in which the packets of each reorder context were received. The reserved reorder buffer entries are added to the proper reorder context linked lists based on their corresponding packet's assigned reorder context (as described in greater detail below). Adding reorder buffer unit entries to a reorder context linked list may include updating the list's head and tail pointers to include the added entry's link field. Each entry includes a processed field to indicate whether the packet associated with that entry has been processed (described below).

In stage 4, the in-flight packet descriptors that are ready for retirement are transmitted out (retired) of the reorder buffer unit 106, in-order with regard to their particular reorder context, but not necessarily in global order. In-flight packet descriptors are retired from the reorder unit when they are ordered within their associated reorder context. Order for a packet within a reorder context is achieved when it's entry is at the head of its assigned reorder context linked list and the packet's processed field has been marked to indicate that the packet has been processed. While in one embodiment the in-flight packet descriptors are transmitted at a rate of one packet per clock cycle, in alternative embodiments more packet descriptors can be retired at a time. As each in-flight packet descriptor is transmitted out of the reorder buffer unit 106, typically its: 1) reorder buffer entry address is retired (making it an out-of-flight packet) and added to a free list of reorder buffer entry addresses; 2) reorder buffer entry is removed from the reorder context linked list that it was associated with; and 3) the reorder context's head pointer is updated with the entry's link field value. However, not every embodiment of the invention works in this fashion, as other embodiments may perform some or all of these operations in different orders. For example, a reorder buffer entry is not added to the free list and not removed from its reorder context linked list after transmission, when reuse fields are employed, as described below. As another example, although a packet descriptor is not transmitted from the reorder buffer unit 106, the reorder buffer entry is added to the free list and removed from its reorder context linked list; see the description of drop fields below.

FIG. 1 illustrates three exemplary orders in which the packet descriptors may be retired from the reorder unit 114. Each of these exemplary orders (130, 135, and 140) retains the initial incoming order within each reorder context, but comprises a different global order. In particular, transmission in-order within a reorder context is achieved in each of the examples, while transmission in the global-order is not. However, it should be understood that the packet descriptors might be retired in the global order.

Thus, a given packet descriptor associated with a given reorder context and globally received after a different packet descriptor from a different reorder context can be retired before that different packet descriptor. As another example, a given packet descriptor associated with a given reorder context and globally received after a different packet descriptor from a different reorder context can be retired before that different packet descriptor even enters stage 3. Thus, it should be evident that in-flight packets from different reorder contexts may be retired out of the global order.

As a result, if a given packet or collection of packets from a micro-flow, which was assigned a given reorder context, is taking a relatively long time to process, packets assigned to other reorder contexts can be retired and transmitted out without waiting. Thus, the number of implemented reorder contexts affects the number of micro-flows that are assigned to the same reorder context. This reduces the interdependence among micro-flows, while increasing the speed with which packets are retired. Furthermore, the conceptual system of FIG. 1 can be implemented in hardware, thereby relieving the execution units from the task of tracking and ordering of the packets. In addition, the scheduling algorithm used in stage 3 can be implemented to provide different levels of quality of service to the different reorder contexts.

Packet Processor Unit

Herein, block diagrams illustrate exemplary packet processing units, in accordance with embodiments of the invention. Also herein, flow diagrams illustrate operations of exemplary packet processing units, according to embodiments of the invention. The operations of the flow diagrams will be described with references to the exemplary packet processing units shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams.

Figure 2:
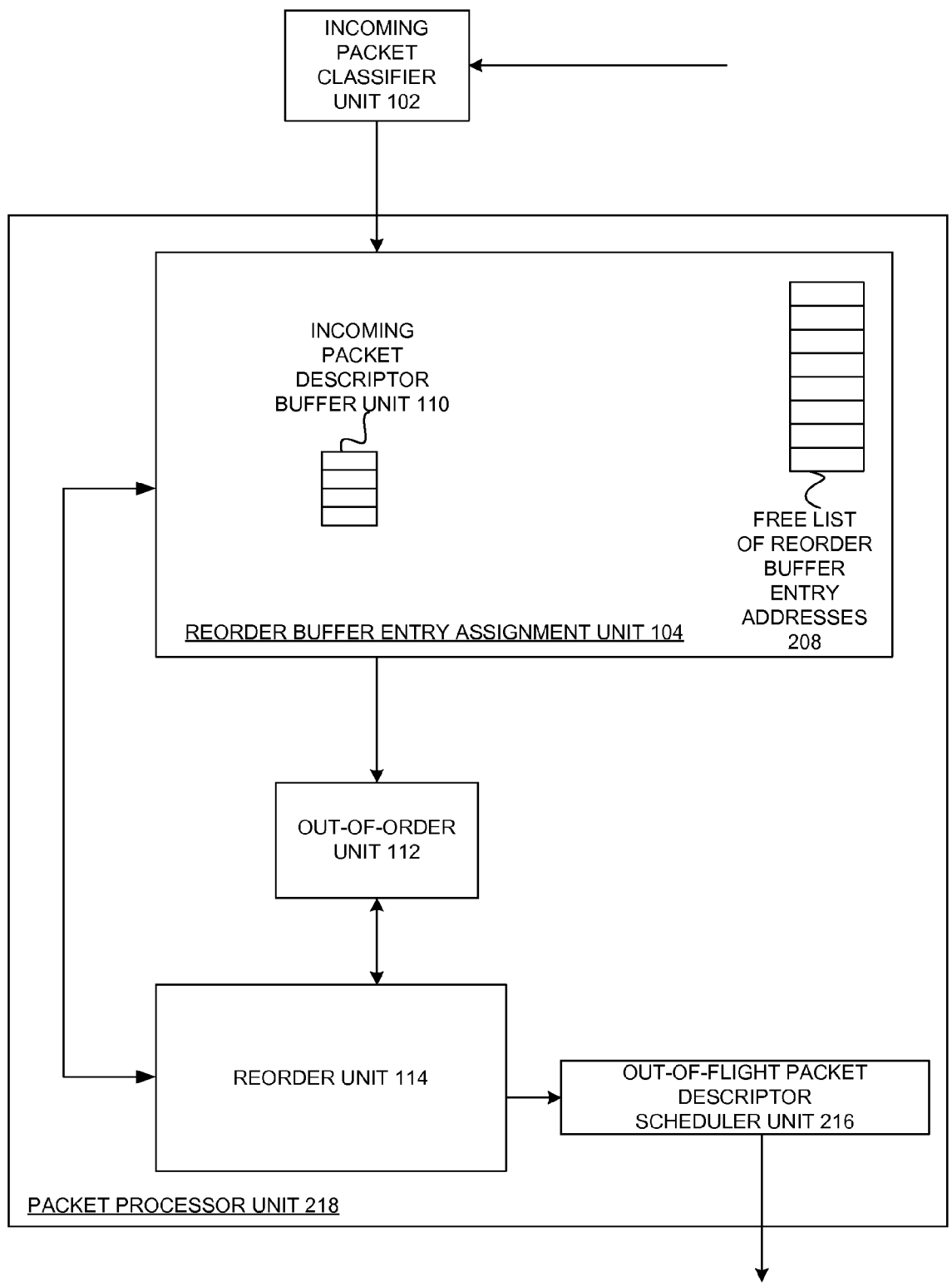
FIG. 2 is a block diagram illustrating parts of an exemplary packet processor unit according to embodiments of the invention.

FIG. 2 is a block diagram illustrating parts of an exemplary packet processor unit according to embodiments of the invention. In one embodiment, a packet processor unit 218 may be any chip for processing packets. For example, in one embodiment, the packet processor unit 218 may be an ingress or egress packet processor on a line card within a network element. The packet processor unit 218 comprises the reorder buffer entry assignment unit 104, which is coupled to the incoming packet classifier unit 102. While the incoming packet classifier unit 102 is shown outside of the packet processor unit 218; in alternative embodiments of the invention, the incoming packet classifier unit 102 is included within the packet processor unit 218.

The incoming packet classifier unit 102 assigns packets to the different reorder contexts as evidenced by the assignment of a reorder context identifier. In certain embodiments of the invention, the packet classifier unit 102 may assign packets to the different reorder contexts based on the results of a hash function. For example, the packet classifier unit 102 may use a packet's source address and port, along with its destination address and port, to assign it to one of 1024 reorder contexts. Such a hash function will assign all packets of a micro-flow to the same reorder context, and it may assign multiple micro-flows to the same reorder context. However, the method for assigning micro-flows to reorder contexts is not so limited, as packets may be assigned to reorder contexts based on any number of relationships related to micro-flows and packets.

The reorder buffer entry assignment unit 104 is connected to the incoming packet classifier unit 102. The reorder buffer entry assignment unit 104 further includes the incoming packet descriptor buffer unit 110 to store incoming packet descriptors. According to embodiments of the invention, the incoming packet descriptor buffer unit 110 comprises a buffer for each reorder context to store packet descriptors (as illustrated in FIG. 1), wherein each buffer is operated as a FIFO to maintain the order in which the packets arrived for each context. Alternative embodiments include a single buffer employing tracking mechanisms for distinguishing which packet descriptors belong to which reorder context. While in one embodiment each buffer can store 1024 entries, alternative embodiments can support a greater or lesser number of entries.

The reorder buffer entry assignment unit 104 further includes a free list of reorder buffer entry addresses 208 ("free list 208"). Free lists are well known in the art, and the free list 208 is used to assign reorder buffer entry addresses to packet descriptors before transmitting them to the out-of-order unit 112, as discussed in connection with FIG. 1. In one embodiment, there are 1024 entries in the reorder buffer unit 106, the number of possible in-flight packets at any given time. According to embodiments of the invention, there may be a counter associated with the free list 208 to more easily determine whether it is empty. For example, in one embodiment the counter is incremented/decremented to represent the number of assigned reorder buffer entry addresses. If the counter is equal to the maximum number of assigned reorder buffer entry addresses (e.g. 128), no reorder buffer entry addresses are available. Therefore, there is no need to search the free list 208 for a reorder buffer entry address.

The out-of-order unit 112 is connected to the reorder buffer entry assignment unit 104. The out-of-order unit 112 requests in-flight packet descriptors when it is able to process them. The reorder buffer entry assignment unit 104 schedules the out-of-flight packet descriptors for transmission to the out-of-order unit 112 responsive to these requests. While in one embodiment the out-of-order unit 112 includes a number of execution units (e.g., 16) and memory controllers (e.g., 5), alternative embodiments include different components. Upon completion of a given packet, the out-of-order unit 112 transmits that packet's descriptor to the reorder unit 114.

The reorder unit 114 is connected to the out-of-order unit 112 and the reorder buffer entry assignment unit 104. The reorder unit 114 reorders in-flight packet descriptors, which may have been processed out-of-order, for retirement in-order with respect to the reorder contexts. Exemplary contents of the reorder unit 114 are discussed in more detail in connection with FIG. 4 (below). Upon transmission from the reorder unit 114, packets are in-order with respect to their assigned reorder context, but not necessarily with respect to their global order.

The packet processor unit 218 further includes an out-of-flight packet scheduler unit 216 connected to the reorder unit 114. The out-of-flight packet scheduler unit 216 schedules out-of-flight packets, which have been processed (possibly out-of-order) and subsequently reordered within their reorder contexts, for transmission.

Figure 3:
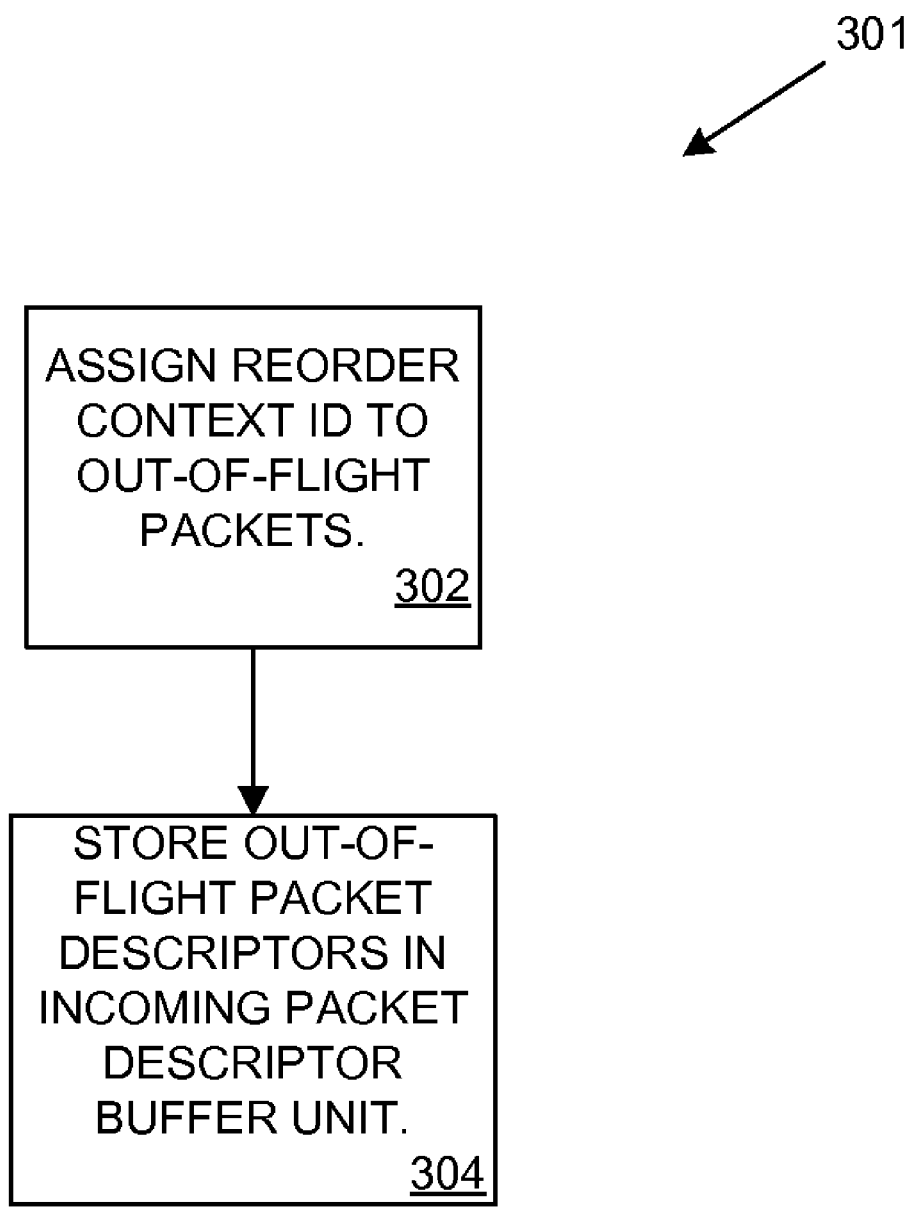
FIG. 3 is a flow diagram illustrating the receipt of packet descriptors according to one embodiment of the invention.

FIG. 3 is a flow diagram illustrating the receipt of packet descriptors according to one embodiment of the invention. The operation of the flow diagram of FIG. 3 will be described with reference to the exemplary packet processing unit of FIG. 2. In particular, FIG. 3 illustrates flow diagram 301, which begins at process block 302.

At block 302, reorder context identifiers are assigned to out-of-flight packets. Control continues at block 304. For example, referring to FIG. 2, the incoming packet classifier unit 102 assigns reorder context identifiers to each packet, as described above.

As shown in block 304, out-of-flight packet descriptors are stored in an incoming packet descriptor buffer. For example, the reorder buffer entry assignment unit 104 stores out-of-flight packet descriptors in the incoming packet descriptor buffer unit 110.

Reorder Unit

Figure 4:
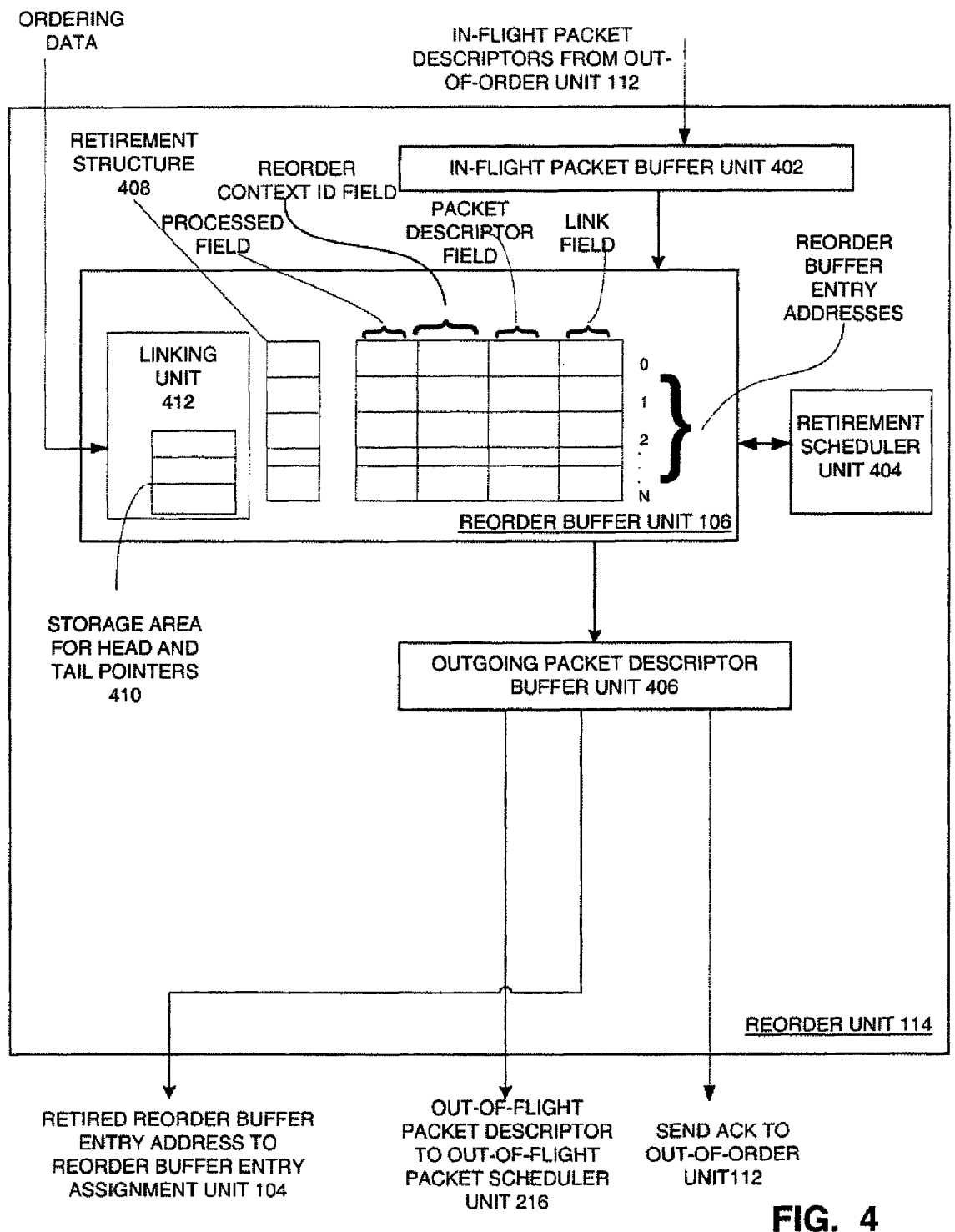
FIG. 4 is a block diagram illustrating parts of the reorder unit 114 according to embodiments of the invention.

FIG. 4 is a block diagram illustrating parts of the reorder unit 114 according to embodiments of the invention. As shown in FIG. 4, the reorder unit 114 includes an in-flight packet buffer unit 402 to store in-flight packet descriptors upon their receipt from the out-of-order unit 112.

The reorder unit 114 also includes the reorder buffer unit 106, coupled with the in-flight packet buffer unit 402, to store in-flight packet descriptors until they are retired. The reorder buffer unit 106 includes a number of entries for storing information related to each packet. The reorder buffer entries include the following fields: 1) a processed field to indicate whether the associated packet has been processed; 2) a reorder context identifier field to indicate which reorder context the packet has been assigned to; 3) a packet descriptor field to store a packet descriptor; 4) and a link field to indicate the next entry in the reorder context linked list associated with that reorder buffer entry (as described below). Alternative embodiments of the invention can include a greater or lesser number of fields.

The reorder buffer unit 106 also includes a linking unit 412 to add reorder buffer entries to and remove reorder buffer entries from the reorder context linked lists. The linking unit 412 includes a storage area 410 for storing head and tail pointers for each reorder context linked list. The head and tail pointers are modified as elements are added to and removed from the reorder context linked lists.

The reorder buffer unit 106 includes a retirement structure 408 to indicate which reorder buffer entries are associated with packets that are ready to be retired. This retirement structure can be implemented any number of different ways. For instance, according to one embodiment of the invention, the retirement structure 408 includes a FIFO structure to which nodes are added when packets are ready to be retired. In this embodiment, the FIFO structure tracks what is ready to be retired, as well as acts to identify the order in which packets will be retired. In particular, if the head of a reorder context linked list is associated with a packet that is ready to be retired, a node indicative of this is added to the retirement structure 408. For example, referring to FIG. 1, when the packets associated with the heads of the reorder context linked lists for reorder contexts five and eight are ready to be retired, nodes corresponding to those packets are added to the retirement structure 408. The nodes can identify one or more of a number of different things (e.g., the buffer entry addresses, the reorder context identifiers, etc.) It should be understood that in embodiments in which the nodes identify reorder contexts, the same reorder context identifier may appear in the FIFO more than once (e.g., if the same reorder context has more than one packet that is ready for retirement).

Alternatively, the retirement structure includes a fixed size structure that includes a field corresponding to each reorder context linked list that is ready to be retired. For example, referring to FIG. 4, the retirement structure 408 would at least include fields corresponding to the reorder context linked lists for reorder contexts five and eight. The fields are marked when packets associated with the heads of the reorder context linked lists are ready to be retired. More specifically, according to embodiments of the invention, the fields include bits that are set to "1" when heads of the corresponding reorder context linked lists are associated with packets that are ready to be retired, and set to "0" when heads are not associated with packets that are ready for retirement. Thus, when the head of reorder context five's reorder context linked list is associated with a packet that is ready to be retired, the retirement structure field for reorder context five is marked. According to alternative embodiments, the fields can be organized differently and set to different values. For example, the fields may include one or more bits, subfields, or structures that are set to any number of values based on the organization of the fields. As a more specific example, the retirement structure field may include a subfield for a packet's address. Therefore, some embodiments of the invention can store the packet's address in the field. One embodiment of the operation of the retirement structure is described below with reference to FIG. 8.

While the retirement structure 408 is shown and described with reference to FIG. 4, alternative embodiments do not include such a structure. For example, a polling method can be used to select packets for retirement. In particular, packets can be selected for retirement by polling the head of each reorder context linked list and determining whether it is associated with a packet that is ready to be retired. In contrast, for embodiments of the invention employing a retirement structure, packets are selected for retirement by choosing from ones that the retirement structure indicate as being ready. Alternatively, any other suitable method for selecting packets for retirement may be used.

The reorder unit 114 includes a retirement scheduler unit 404 connected to the reorder buffer unit 106 to schedule packets for retirement. For embodiments of the invention that include a retirement structure 408, the retirement scheduler 404 retires packets corresponding to entries of the retirement structure. For example, according to embodiments of the invention that organize the retirement structure as a FIFO (as described above), the retirement scheduler unit 404 schedules for retirement the packet associated with the first entry of the retirement structure 408. Alternatively, according to embodiments of the invention that organize the retirement structure 408 as a fixed size structure (as described above), the retirement scheduler unit 404 schedules a packet associated with one of the fields that is marked as being ready for retirement. For embodiments of the invention that do not include a retirement structure 408, the retirement scheduler 404 polls the heads of the reorder context linked lists for packets that are ready to be retired. Upon determining that one or more packets are ready for retirement, the retirement scheduler unit 404 schedules one of the packets for retirement. The retirement scheduler unit 404 chooses between the ready packets based on the round robin scheduling algorithm or any other suitable scheduling algorithm.

The reorder unit 114 also includes an outgoing packet descriptor buffer unit 406 connected to the reorder buffer unit 406 and the reorder buffer entry assignment unit 104. The outgoing packet descriptor buffer unit 406 stores packet descriptors that are being retired, and transmits them to the out-of-flight packet scheduler unit 216. According to embodiments of the invention, upon being stored in the outgoing packet buffer unit 514, a packet descriptor's reorder buffer entry address is retired and returned to the free list 208. However, according to alternative embodiments of the invention, the packet descriptor's reorder buffer entry address is not returned to the free list 208; for an example of this, see the description of reuse fields below.

Figure 5:
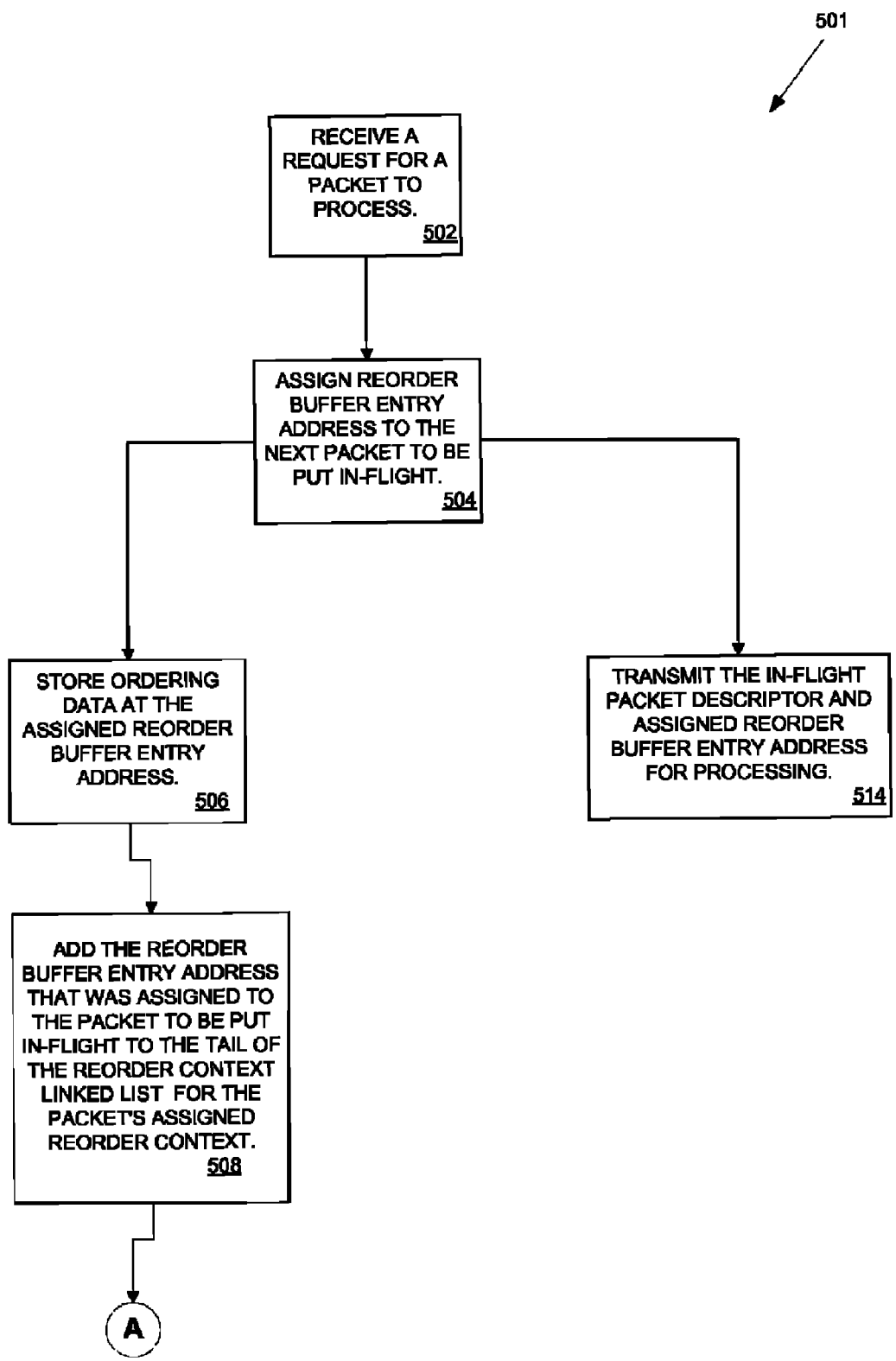
FIG. 5 is a flow diagram for processing a request to process a packet according to one embodiment of the invention.

FIG. 5 is a flow diagram for processing a request to a process a packet according to one embodiment of the invention. The operation of the flow diagram of FIG. 5 will be described with reference to the exemplary packet processing unit of FIGS. 2 and 4. For the purpose of illustration, flow diagram 501 shows certain operations being performed in parallel; however, other embodiments of the invention can perform those operations sequentially.

At process block 502, a request is a received for a packet to process. For example, with reference to the exemplary embodiment of FIG. 2, the reorder buffer entry assignment unit 104 receives a request to process a packet from the out-of-order unit 112.

As show at block 504, a reorder buffer entry address is assigned to the next packet to be put in-flight. Control continues in parallel with blocks 506 and 514. While one embodiment these operations split into blocks that are executed in parallel, other embodiments can have blocks that are sequentially executed. For example, the reorder buffer entry assignment unit 104 assigns a reorder buffer entry address from the free list 208 to the next packet to be put in-flight.

At block 514, the in-flight packet descriptor and assigned reorder buffer entry address are transmitted for processing. For example, the reorder buffer entry assignment unit 104 transmits the in-flight packet descriptor and assigned reorder buffer entry address to the out-of-order unit 112 for processing.

As show in block 506, ordering data is stored at the assigned reorder buffer entry address. Control continues at block 508. For example, the reorder buffer entry assignment unit 104 transmits ordering data to the reorder unit 114 where it is stored at the assigned reorder buffer entry address. Ordering data can be any data associated with the packet (e.g., the packet's assigned reorder context identifier).

At block 508, the reorder buffer entry address that was assigned to the packet to be put in-flight is added to the tail of the reorder context linked list for that packet's assigned reorder context. For example, the linking unit 412 adds an element for the next packet to be put in flight to the tail of the reorder context linked list that corresponds with that packet's assigned reorder context. To add an element to the corresponding reorder context linked list, the linking unit 412 modifies the link field of the reorder buffer entry that is currently at the tail of that reorder context linked list. The tail's link field is modified so that it points to the reorder buffer entry address that was assigned to the packet (at block 504). The linking unit 412 also updates the reorder context linked list's tail pointer to point at the reorder buffer entry address assigned to the packet. The link filed of the newly added element is set to "null" because it is at the tail of the reorder context linked list. If the reorder context link list was previously empty, then the reorder context linked list's head point must also be updated to point to the reorder buffer entry address assigned to the packet.

Figure 6:
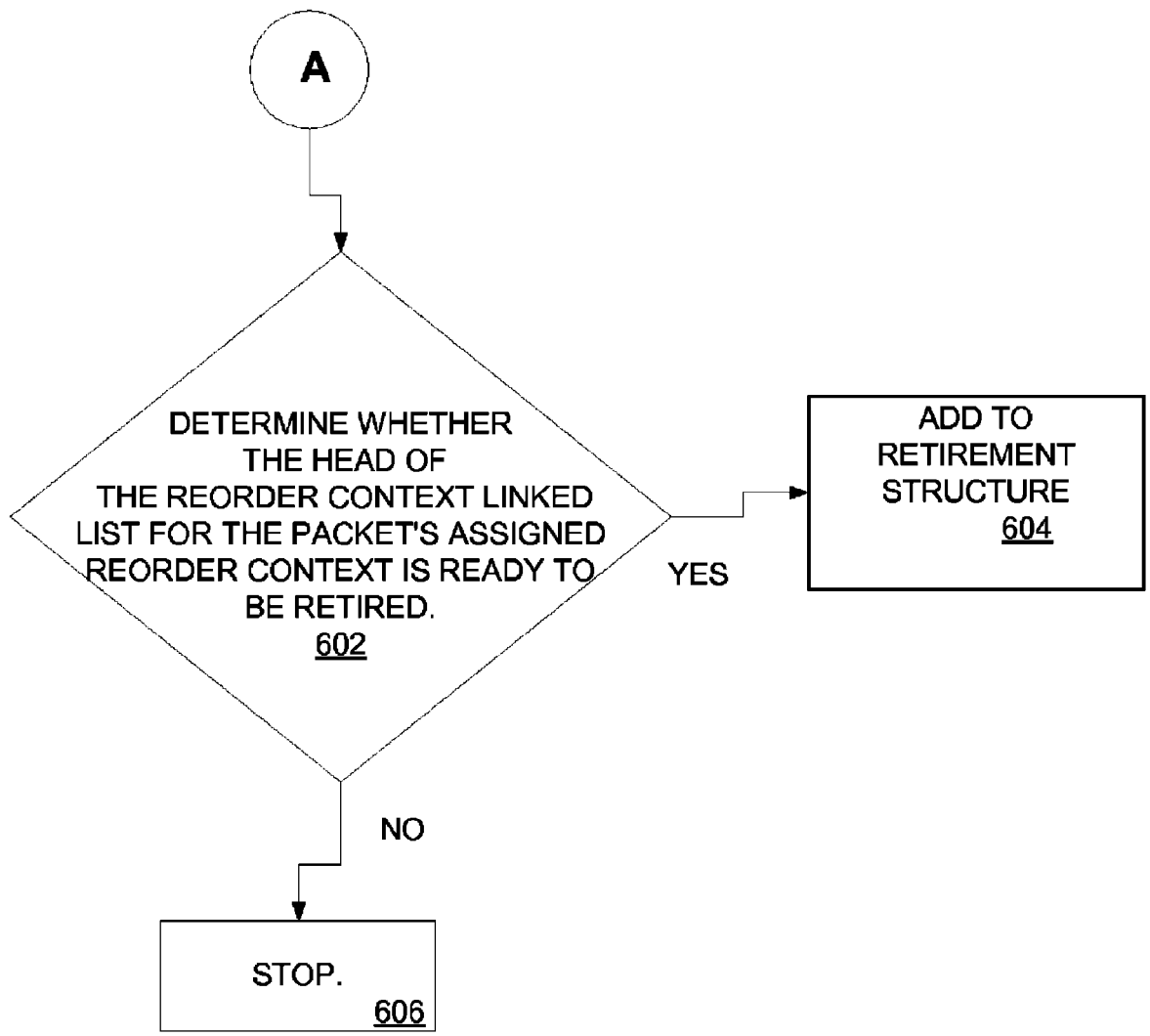
FIG. 6 is a flow diagram for processing retirement structure entries, according to embodiment of the invention.

For embodiments of the invention that include a retirement structure, control continues from block 508 to "A", which is set out in FIG. 6. For embodiments of the invention that do not employ a retirement structure, control stops at block 508.

FIG. 6 is a flow diagram for processing retirement structure entries, according to embodiment of the invention. The operation of the flow diagram of FIG. 6 will be described with reference to the exemplary packet processing units shown in FIGS. 2 and 4. FIG. 6 can be used in conjunction with operations of embodiments of the invention that include a retirement structure. For example, the flow diagram of FIG. 6 can be used in conjunction with the flow diagrams of FIGS. 5, 7, and 10 when describing operations of embodiments that include a retirement structure. As a more specific example, as shown, the operations of FIG. 5 can continue at block 602 of FIG. 6.

At block 602, it is determined whether the head of the reorder context linked list for the packet's assigned reorder context is ready to be retired. If the head is ready to be retired, control continues at block 604. Otherwise, control continues at block 606. For example, referring to the exemplary embodiment of FIG. 4, the linking unit 412 determines whether the head of the reorder context linked list for the packet's assigned reorder context is ready to be retired.

As shown in block 604, the retirement structure is added to. As noted, according to different embodiments of the invention, the retirement structure 408 can be organized in a number of ways. For example, if the retirement structure is organized as a FIFO, adding to it is done as follows. Upon finding a head of a reorder context linked list associated with a packet that is ready to be retired, the linking unit 412 adds a node corresponding to that head to the retirement structure 408 (as described above). Alternatively, if the retirement structure includes a field for each reorder context, the operation at block 604 is performed as follows. Upon finding a head associated with a packet that is ready to be retired, the linking unit 412 marks the retirement structure field corresponding to the packet's reorder context linked list (as described above). The mark indicates that the head of the corresponding reorder context linked list is associated with a packet that is ready to be retired.

At block 606, control stops.

Figure 7:
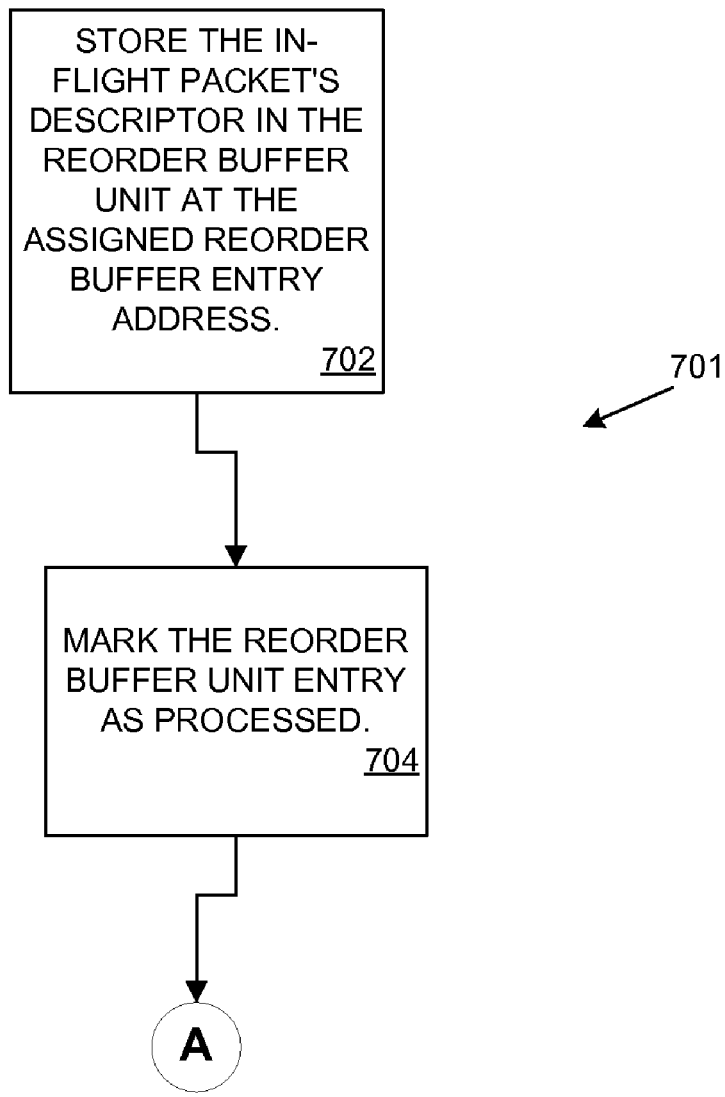
FIG. 7 is a flow diagram illustrating operations performed in conjunction with completing the processing of a packet, according to embodiments of the invention.

FIG. 7 is a flow diagram illustrating operations performed in conjunction with completing the processing of a packet, according to embodiments of the invention. The operation of the flow diagram in FIG. 7 will be described with reference to the exemplary embodiments of FIGS. 2 and 4.

At block 702, the in-flight packet's descriptor is stored in the reorder buffer unit at the assigned reorder buffer entry address. Control continues at block 704. For example, the in-flight packet descriptor buffer unit 402 stores the in-flight packet's descriptor in the reorder buffer unit 106, at the packet's assigned reorder buffer entry address.

As shown in block 704, the reorder buffer entry is marked to indicate that it has been processed. For example, with reference to the exemplary embodiment of FIG. 4, the in-flight packet descriptor buffer unit 402 marks the processed field of the packet's assigned reorder buffer entry to indicate that the packet has been processed. For embodiments of the invention that include a retirement structure, flow diagram 701 continues at block 602 of FIG. 6, in the manner described above. Otherwise, control stops at 704.

Figure 8:
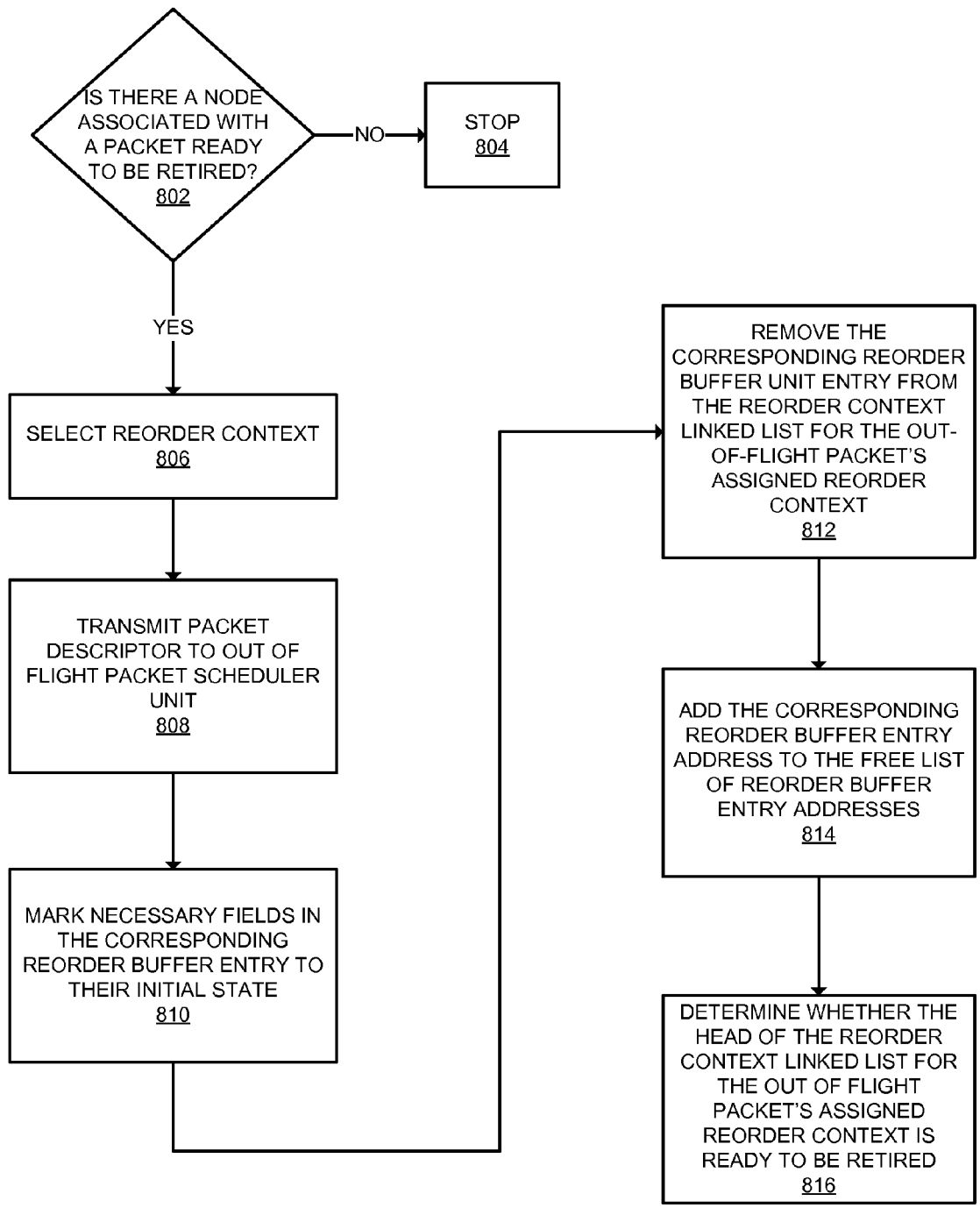
FIG. 8 is a flow diagram for retiring packets, according to embodiments of the invention.

FIG. 8 is a flow diagram for retiring packets, according to embodiments of the invention. The operation of the flow diagram of FIG. 8 will be described with reference to the exemplary embodiments of FIGS. 2 and 4.

At block 802, it is determined whether there is a node associated with a packet that is ready to be retired. For example, for an embodiment that employs a retirement structure, the retirement scheduler unit 404 determines whether one or more fields in the retirement structure are marked to indicate that a packet(s) is ready to be retired. If there is not a reorder context with a packet ready to be retired, control stops at block 804. Otherwise, control continues at block 806.

At block 806, a reorder context is selected. For example, according to an embodiment that employs a retirement structure, the retirement scheduler unit 404 selects a node associated with a packet that is ready to be retired. Alternatively, the retirement scheduler unit 404 may select a field that is marked as being associated with a packet that is ready to be retired. For embodiments that do not include a retirement structure, the retirement scheduler unit 404 selects a reorder context linked list whose head is ready to be retired. Control continues at block 808.

As shown in block 808, the packet descriptor is transmitted to the out-of-flight packet scheduler unit 216. For example, the outgoing packet descriptor buffer unit 406 transmits the packet descriptor the out-of-flight scheduler unit 216. Control continues at block 810.

At block 810, the necessary fields in the corresponding reorder buffer entry are marked to their initial state. Control continues at block 812. For example, referring to the exemplary embodiment of FIG. 4, the retirement scheduler unit 404 marks the necessary reorder buffer entry fields to their initial state. As a more specific example, a reorder buffer entry's processed field can be initially marked to indicate that is has not been processed. After a packet associated with that reorder buffer entry is processed, the entry's processed field is marked to indicate that it has been processed (see FIG. 7). After the packet is retired, the processed field is marked to its initial state (i.e., it is marked to indicate that is has not been processed). The other fields included in the exemplary embodiment of FIG. 4 may be handled in a similar fashion. For alternative embodiments that include additional fields not shown in FIG. 4 (see FIG. 9), those additional fields are also handled in a similar fashion. While in the embodiment of FIG. 8 the necessary fields in the reorder buffer entry address associated with the selected node are set to an initial state, this does not mean that all fields are altered in all embodiments of the invention. For example, on such embodiment is described below with reference to the concept of reuse fields.

At process block 812, the corresponding reorder buffer unit entry is removed from the reorder context linked list for the out-of-flight packet's assigned reorder context. Control continues at block 814. For example, the linking unit 412 removes the head element of the reorder context linked list for the out-of-flight packet's assigned reorder context. Because elements of a reorder context linked list correspond with reorder buffer entries, removing the head element of the reorder context linked list removes the corresponding reorder buffer entry from that reorder context linked list. When removing the head element, if the reorder context linked list contains more than one element, the linking unit 412 modifies the reorder context linked list's head pointer to point to the second element of the reorder context linked list. Otherwise, the linking unit 412 modifies the head and tail pointers to point to "null." While in the embodiment of FIG. 8 the corresponding reorder buffer unit entry is removed from the reorder context linked list for the out-of-flight packet's assigned reorder context, alternative embodiments do not remove such an entry in the same manner. For example, on such embodiment is described below with reference to the concept of reuse fields.

At block 814, the reorder buffer entry address associated with the packet that is to be retired is added to the free list of reorder buffer entry addresses. Control continues at block 816. For example, after the retirement scheduler unit 404 selects a reorder context, it sends the packet descriptor associated with that node to the outgoing packet descriptor buffer unit 406. The outgoing packet descriptor buffer unit 406 communicates with the reorder buffer entry assignment unit 104 causing the nodes corresponding reorder buffer entry address to be added to the free list 208. For embodiments of the invention that do not include a retirement structure 408, the reorder buffer entry addresses are added to the free list 208 in a similar manner. While in the embodiment of FIG. 8 the reorder buffer entry address associated with the selected node is retired, alternative embodiments do not retire such an entry, but rather keep it for later use. For example, on such embodiment is described below with reference to reuse fields.

As shown in process block 816, it is determined whether the head of the reorder context linked list for the out-of-flight packet's assigned reorder context is ready to be retired and the retirement structure is updated as needed. For example, the linking unit 412 determines whether the packet associated with the head of the reorder context linked list for the out-of-flight packet's assigned reorder context is ready to be retired. That is, after the head element is removed from the reorder context linked list, the new head of that reorder context linked list is checked to determine whether it is associated with a packet that is ready to be retired. Upon determining that the head's packet is ready to be retired, the linking unit 412 updates the retirement structure. For embodiments of the invention that organize the retirement structure 408 as a FIFO, a node corresponding to the ready packet is added to the retirement structure 408. For embodiments of the invention that organize the retirement structure 408 to include fields for each reorder context linked list, the appropriate field is marked to indicate that the head's packet is ready to be retired. For embodiments of the invention that do not include a retirement structure, block 816 can be omitted; thus control for such embodiments stops at block 814.

While FIG. 8 illustrates the retirement of a single reorder buffer entry at a time, alternative embodiments retire more than one entry at a time. In addition, while the flow diagrams have a certain order to the blocks for purposes of illustration, in alternative embodiments the blocks are performed in a different order, blocks are combined, and/or different blocks are performed in parallel. For example, the operations of FIG. 5 split into parallel paths, as described above. In FIG. 5, after an element is added to the appropriate reorder context linked list, control continues at "A" of FIG. 6, where the head of that reorder context linked list is checked for a packet that is ready to be retired. Alternative embodiments could be performed the operations of FIG. 5 sequentially; thus, changing the flow such that FIG. 5 does not flow into FIG. 6 in the same manner.

Having described certain aspects of the invention, additional aspects will now be described. In particular, the use of drop fields, write pending fields, and reuse fields will now be described. As will be apparent from the below, different embodiments of the invention do not use write pending fields, drop fields, and/or reuse fields. In addition, it should be understood that drop fields, write pending fields, and reuse fields are independent aspects of the invention (that is, a given embodiment need not implement all three). The concepts of drop fields, write pending fields, and reuse fields will be introduced with reference to FIG. 9. Embodiments illustrating exemplary implementations of write pending fields will be described below with reference to FIGS. 9 and 10.

Referring now to the concept of drop fields. As is well known in the art, it is desirable and/or necessary to drop packets under certain circumstances. While certain embodiments do not allow for packets to be dropped, alternative embodiments provide different mechanisms to drop packets. For example, certain embodiments provide for mechanisms to drop packets before they are selected for retirement (e.g., when an execution unit determines that a packet should be dropped, it drops the packet and transmits signals to cause the resources allocated for that packet to be relinquished—frees the assigned reorder buffer entry address; etc.) As another example, certain embodiments provide mechanisms for dropping packets after they are selected for retirement. For instance, embodiments of the invention employing drop fields inspect the reorder buffer entry's drop field before transmitting the packet descriptor to the out-of-flight packet scheduler unit, at block 814 of FIG. 8. If the drop field indicates that the packet is to be dropped, the packet descriptor is not transmitted. However, if the drop filed indicates that the packet is not to be dropped, the packet descriptor is transmitted to the out-of-flight scheduler unit.

The concept of write pending fields will now be described. Execution units often modify packets during packet processing. If packet modification is required, at least part of the contents of the packet are retrieved from memory, modified, and stored back in memory. If a packet descriptor were allowed to be retired before such modifications were stored back to memory (e.g., due to caches, write buffers, etc.), then the packet processing unit 218 would forward the unmodified packet rather than the modified packet. Various embodiments prevent this situation using various different techniques. For example, certain embodiments are implemented such that it is known that such modifications will be made to memory before a corresponding packet descriptor could even reach the circuitry that selects the next packet descriptor to be retired ("retirement selection circuitry")(e.g., the packet processing unit 218 is implemented such that the time it takes for a packet descriptor to reach the retirement selection circuitry is sufficiently long to guarantee that any modification will be already written to memory; a separate buffer is included in the out-of-order unit 112 to buffer packet descriptors as long as they have pending writes; etc.). As another example, certain embodiments that allow packet descriptors to reach the retirement selection circuitry before pending writes may have been completed include mechanisms that allow the retirement selection circuitry to determine if there are any pending writes (see FIG. 10). For instance, different embodiments of the invention described with reference to FIG. 9 employ write pending fields to preclude packet retirements when execution unit packet writes have not completed.

Referring now to the concept of reuse fields. Reuse fields are used to maintain packet order when creating derivative packets. Derivative packets are newly created packets based on existing packets being processed, such as packets that are copied or subdivided. For example, when packets are multicast, out-of-order unit 112 creates multiple copies of a given packet, where each copy includes a distinct packet header and an identical packet body. As another example, when packets are fragmented, they are broken into multiple smaller packets. While certain embodiments do not allow for creating derivative packets, alternative embodiments provide mechanisms for maintaining packet order while creating derivative packets. For example, to maintain packet order without assigning new reorder buffer entry addresses to new derivative packets, all packets derived from the same packet reuse the same reorder buffer entry, according to embodiments of the invention.

Figure 9:
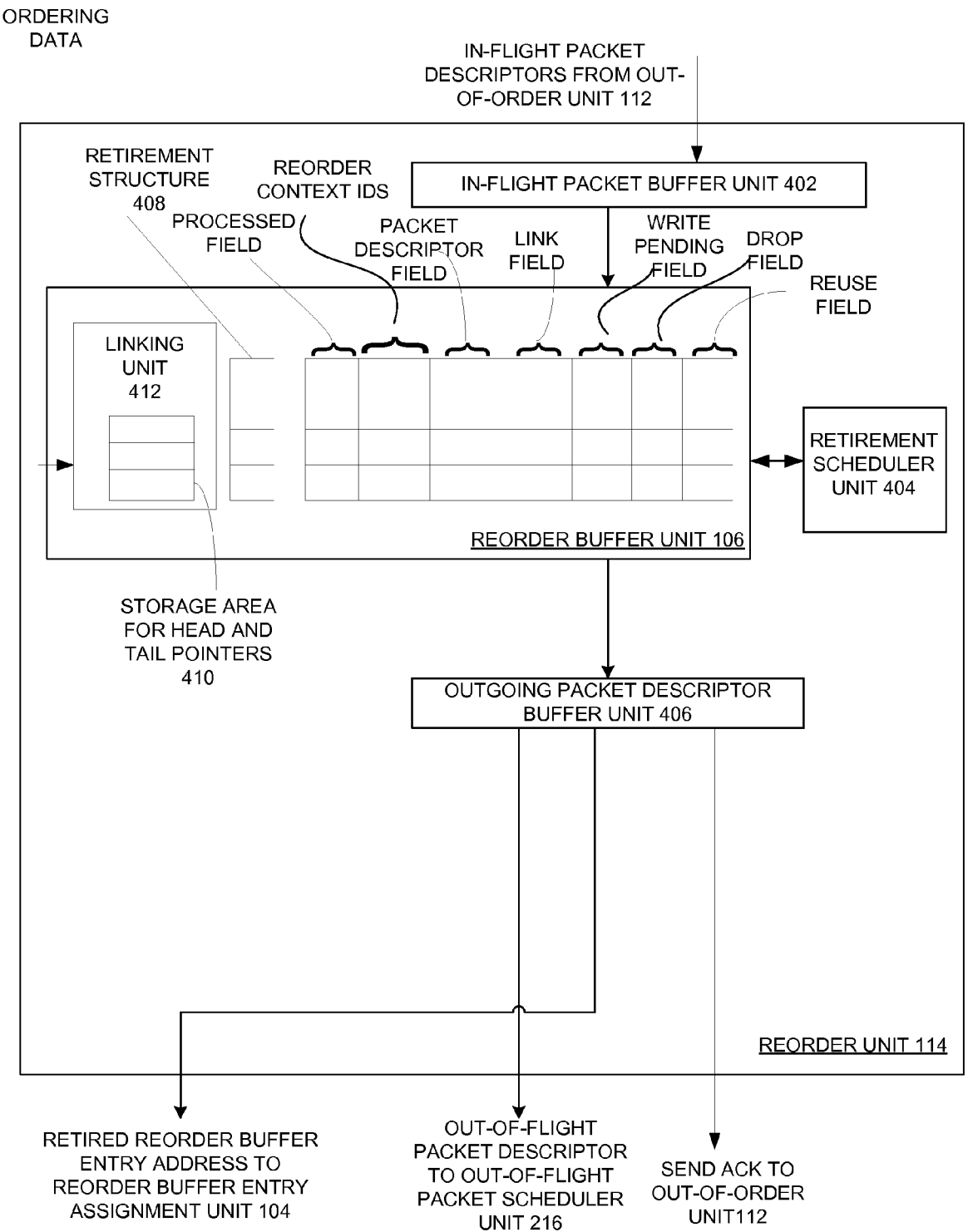
FIG. 9 is a block diagram illustrating portions of the reorder unit 114 according to embodiments of the invention.

FIG. 9 is a block diagram illustrating parts of the reorder unit 114 according to embodiments of the invention. FIG. 9 is similar to the exemplary embodiment of FIG. 4 with a number of fields added to the reorder buffer unit 106. More specifically, write pending fields, drop fields, and reuse fields are included in the reorder buffer unit 106. In certain embodiments of the invention, for each packet descriptor, the states of the write pending, drop, and reuse fields are determined by the out-of-order unit 112. In one embodiment of the invention, the write pending, drop, and reuse fields are altered to the state identified by the out-of-order unit 112 along with the storing of an in-flight packet descriptor in an entry in the reorder buffer unit 106. For example, referring to the embodiment of FIG. 7, at process block 704, a reorder buffer unit entry's write pending, drop, and reuse fields may be altered when the reorder buffer unit entry is marked as processed. In contrast, alternative embodiments alter the write pending, drop, and reuse fields for a given entry to a default state when that entry is retired (e.g., see FIG. 8, block 818); and then alter only those of the write pending, drop, and reuse fields from the default state as necessary when the next in-flight packet descriptor is stored in that reorder buffer entry.

Figure 10:
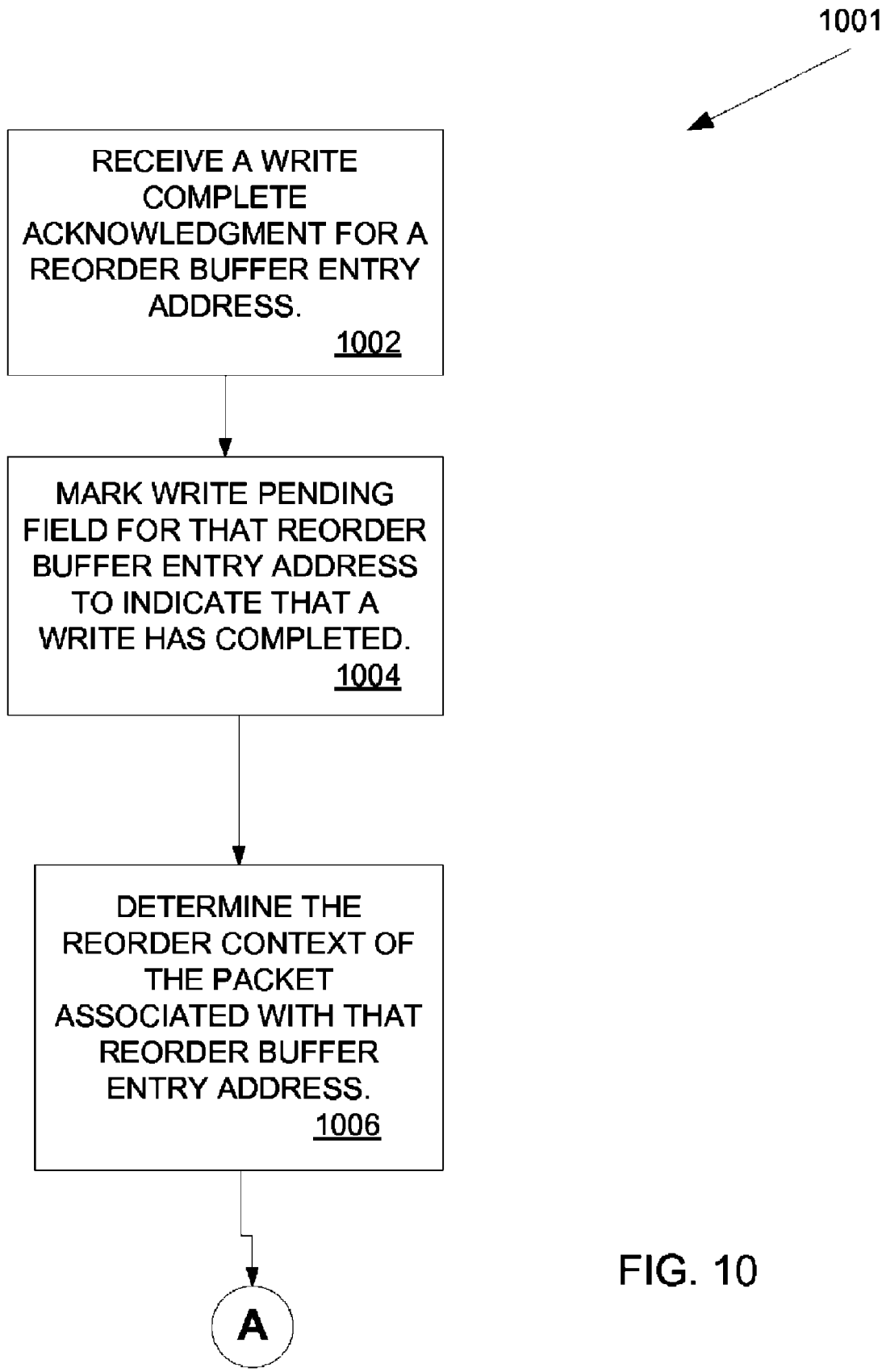
FIG. 10 is a flow diagram illustrating operations performed in conjunction with completing a packet modifying write operation.

FIG. 10 is a flow diagram illustrating operations performed in conjunction with completing a packet modifying write operation. The operation of the flow diagram of FIG. 10 will be described with reference to the exemplary packet processing unit of FIGS. 2 and 9.

At block 1002, a write complete acknowledgement for a reorder buffer entry address is received. Control continues at block 1004. For example, the in-flight packet descriptor buffer unit 402 receives a write complete acknowledgement for a particular reorder buffer entry address from the out-of-order unit 112. The write complete acknowledgement indicates that a packet modifying write has completed.

As shown in block 1004, the write pending field is marked for that reorder buffer entry address to indicate that a write has completed. For example, the in-flight packet descriptor buffer unit 402 marks the write pending field of the reorder buffer unit entry that was designated in the write complete acknowledgment. This mark indicates that a write complete acknowledgement has been received for that corresponding reorder buffer entry address.

As shown in block 1006, the reorder context of the packet associated with that reorder buffer entry is determined. For example, the linking unit 412 determines the reorder context of the packet stored in the designated reorder buffer entry. For embodiments of the invention that do not employ a retirement structure, the operations performed at block 1006 could be omitted; thus, for those embodiments control would stop at block 1004. For embodiments of the invention that include a retirement structure, control continues at "A," which is set out in FIG. 6 (as described above).

Figure 11:
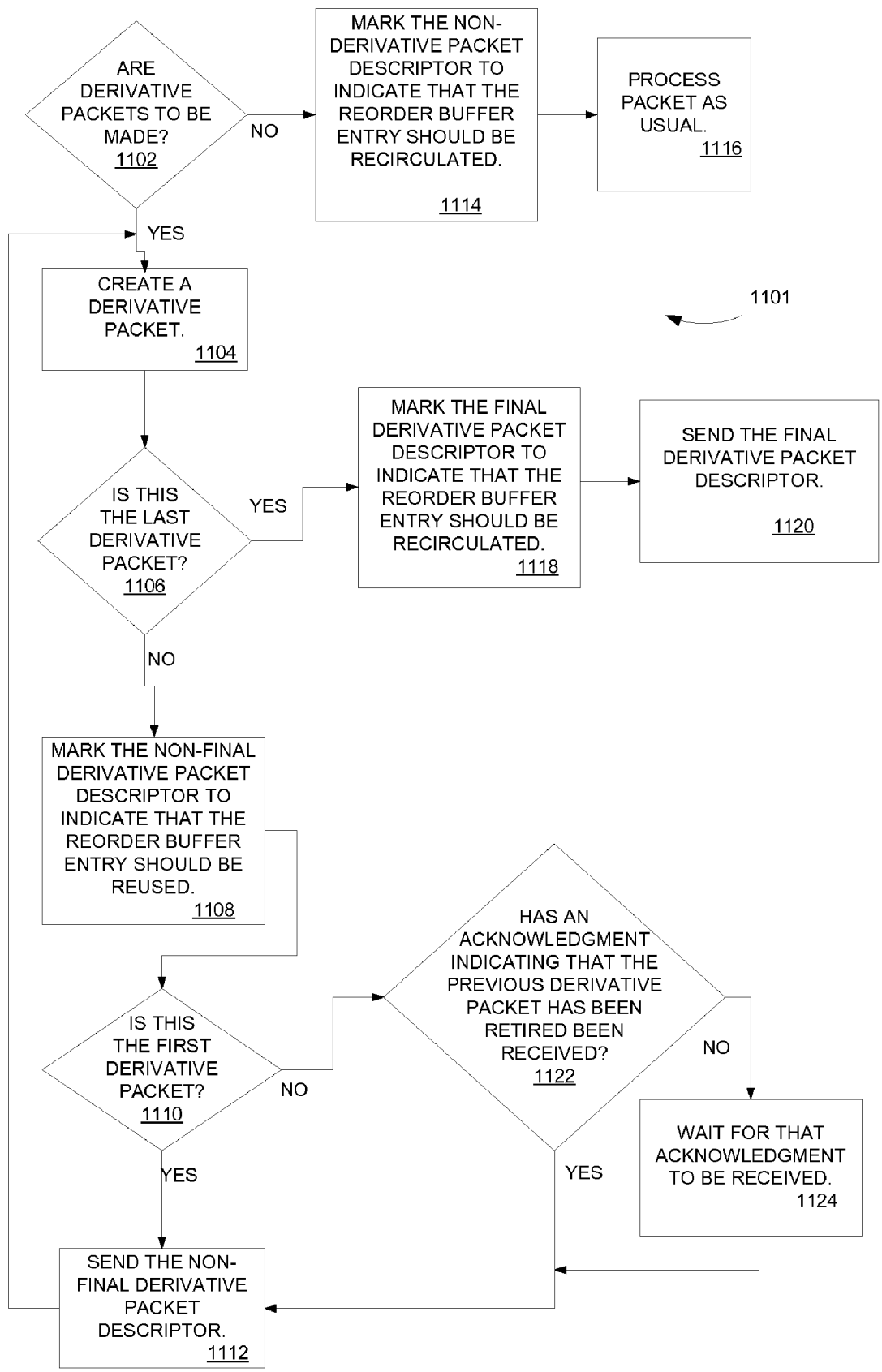
FIG. 11 is a flow diagram illustrating the processing of packets according to embodiments of the invention

FIG. 11 is a flow diagram illustrating the processing of packets according to embodiments of the invention. The operations of the flow diagram will be described with reference to the exemplary embodiment of FIGS. 2 and 9. However, it should be understood that the operations of flow diagrams can be performed by embodiments of the invention other than those discussed with reference to FIGS. 2 and 9, and the embodiments discussed with reference to FIG. 11 can perform operations different than those discussed with reference to the flow diagrams. In particular, FIG. 11 illustrates flow diagram 1101, which begins at process block 1102.

In process block 1102, it is determined whether derivative packets are to be made. If derivative packets are to be made, control continues at process block 1104. Otherwise control continues at process block 1114. According to the exemplary embodiment of FIG. 2, the out-of-order unit 112 determines whether derivative packets are to be made. For example, a derivative packet may be made when a packet is to be multicast or fragmented.

As shown in process block 1114, the nonderivative packet descriptor is marked to indicate that the reorder buffer entry should be recirculated. For example, out-of-order unit 112 may mark the nonderivative packet descriptor's reuse bit 806 to indicate the packet's entry in reorder buffer unit 106 should be added to the free list of reorder buffer unit entry addresses 208 after it is retired. From block 1114, control passes to block 1116.

In process block 1116, the packet is processed as usual. For example, the out-of-order unit 112 performs any necessary packet processing and transmits the packet's descriptor and reorder buffer entry address to the reorder unit 114.

As shown in process block 1104, a derivative packet is created. Control continues at process decision block 1106.

In process decision block 1106, it is determined whether the packet created is the last derivative packet to be made. For example, the out-of-order unit 112 determines whether the current packet is the last derivative packet to be made. If it is the last derivative packet to be made, control continues at process block 1118. Otherwise, control continues at process block 1108.

As shown in process block 1118, the final derivative packet descriptor is marked to indicate that the reorder buffer entry should be recirculated. Control continues at process block 1120. For example, the out-of-order unit 112 marks the packet descriptor to indicate that the reorder buffer unit entry should be recirculated. That is, the out-of-order unit 112 is instructing the reorder unit to add the reorder buffer unit entry to the free list of reorder buffer unit entry addresses 208.

In process block 1120, the final derivative packet descriptor is sent. The out-of-order unit 112 sends the final derivative packet's descriptor and reorder buffer entry address to the reorder unit 114.

As shown in process block 1108, the non-final derivative packet descriptor is marked to indicate that the reorder buffer entry should be reused. For example, the out-of-order unit 112 marks the non-final derivative packet descriptor's reuse field to indicate that the reorder buffer unit entry should not be added to the free list of reorder buffer entry addresses 208.

In process block 1110, it is determined whether the packet is the first derivative packet. If the packet is the first derivative packet, control continues at process decision block 1112. Otherwise, control continues at process block 1122.

As shown in process block 1122, it is determined whether an acknowledgement indicating that the previous derivative packet has been retired has been received. For example, the out-of-order unit 112 determines whether it has received an acknowledgement indicating that the reorder unit 114 has retired the previous derivative packet. If such an acknowledgement has been received, control continues at process block 1112. Otherwise, control continues at process block 1124.

In process block 1124, there is a wait for the acknowledgement to be received. For example, the execution unit of the out-of-order unit 112 processing the packet does not send additional derivative packets to the out-of-order unit 112 until it receives the acknowledgement indicating that the previous derivative packet has been retired. Once the acknowledgement is received, control continues at process block 1112. In one embodiment, during the time in which the out-of-order unit 112 is waiting to receive the acknowledgment, it can continue with other tasks, such as the generation of subsequent derivative packet descriptors.

As shown in process block 1112, the non-final derivative packet descriptor is sent. For example, the out-of-order unit 112 sends the non-final derivative packet descriptor to the reorder unit 114. Control continues back to process block 1104.

Figure 12:
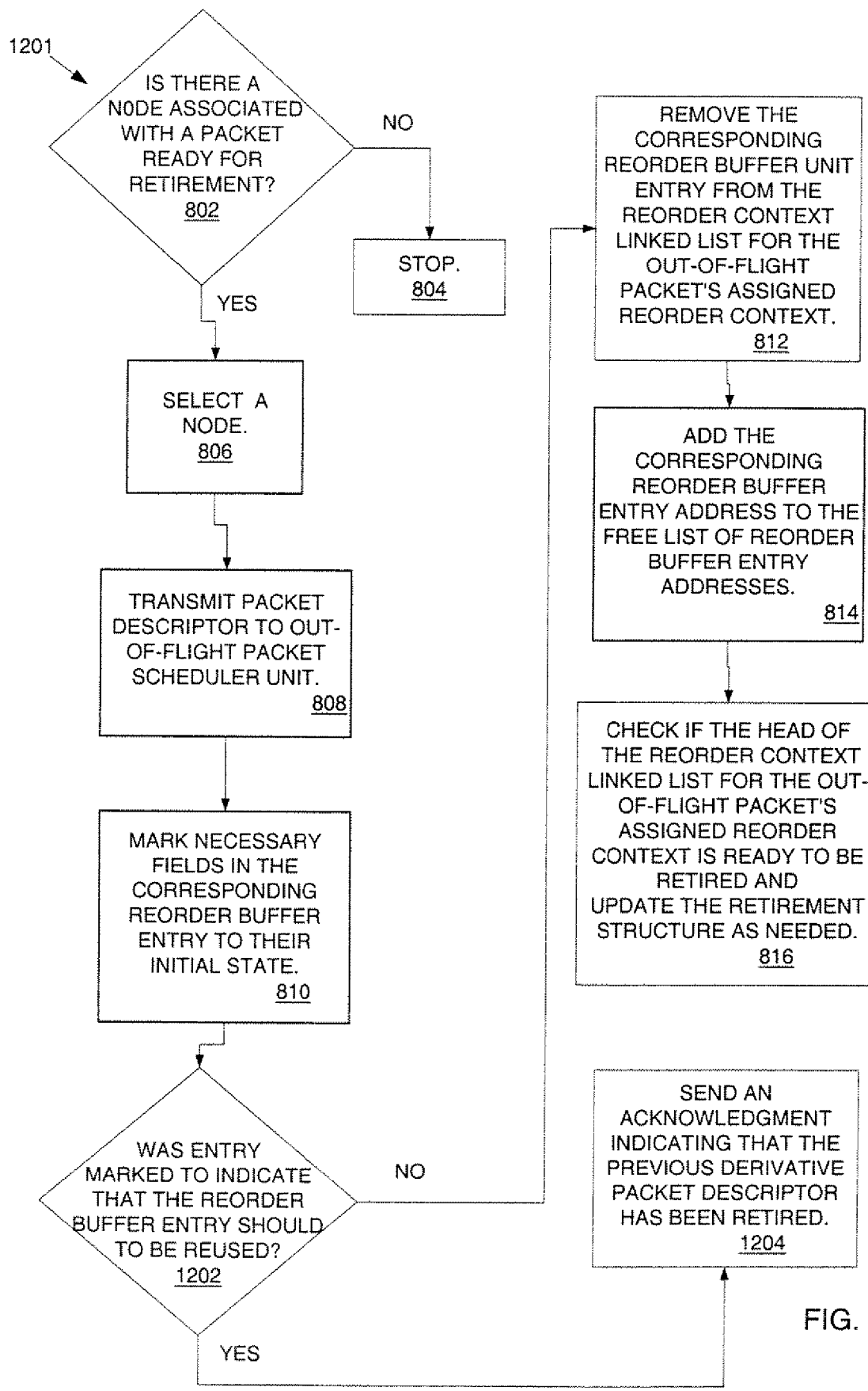
FIG. 12 is a flow diagram illustrating the retirement of derivative packets according to embodiments of the invention.

FIG. 12 is a flow diagram illustrating the retirement of derivative packets according to embodiments of the invention. FIG. 12 is similar to FIG. 8, with process blocks added for reusing reorder buffer entries. Because FIG. 12 is similar to FIG. 8, only the added process blocks will be described. The operations of the flow diagram will be described with reference to the exemplary embodiment of FIGS. 2 and 9. However, it should be understood that the operations of flow diagrams can be performed by embodiments of the invention other than those discussed with reference to FIGS. 2 and 9, and the embodiments discussed with reference to FIG. 12 can perform operations different than those discussed with reference to the flow diagrams.

From block 810, control passes to block 1202. In decision block 1202, it is determined whether the selected entry is marked to indicate that the reorder buffer entry should be recirculated upon retirement. For example, reorder unit 114 determines whether the selected entry's reuse field is marked to indicate that the reorder buffer unit entry should be reused upon retirement. If the reuse field for the entry is marked to indicate that the reorder buffer entry should be reused upon retirement, control continues at process block 1204. Otherwise, control continues at process block 812. From process block 812, the process continues as described above with reference to FIG. 8.

As shown in process block 1204, an acknowledgement indicating that the previous derivative packet descriptor has been retired is sent. For example, referring to FIG. 9, the reorder unit 114 sends an acknowledgement to the out-of-order unit 112 after the reorder unit 114 retires the previous derivative packet descriptor. According to certain embodiments, after the out-of-order unit 112 retires the previous derivative packet descriptor from the reorder buffer unit 106, the next derivative packet may reuse the retired reorder buffer unit entry.

A machine-readable medium includes any mechanism that provides (i.e., stores and/or transmits) information in a form readable by a machine (e.g., a computer). For example, a machine-readable medium includes machine-readable storage medium (e.g., read only memory (ROM); random access memory (RAM); magnetic disk storage media; optical storage media; flash memory devices) or machine-readable transmission medium such as electrical, optical, acoustical or other form of propagated signals (e.g., carrier waves, infrared signals, digital signals, etc.); etc. The line cards and control cards included in the different network elements include memories, processors, and/or Application Specific Integrated Circuits ("ASICs").

Although the invention has been described with reference to specific exemplary embodiments, it will be evident that various modifications and changes may be made to these embodiments without departing from the broader spirit and scope of the invention. For example, different input formats may be used. Accordingly, the specification and drawings are to be regarded in an illustrative rather than a restrictive sense.

What is claimed is:

1. A method for out-of-order processing, comprising:
   receiving a plurality of packets in a global order;
   assigning the plurality of packets to different ones of a plurality of reorder contexts;
   storing information including packet descriptors representing each of the received packets;
   for each of the plurality of reorder contexts, maintaining a reorder context linked list that tracks the order in which those packets assigned to that reorder context and currently stored were received relative to the global order;
   processing the plurality of packets irrespective of the global order and irrespective of the order maintained by each reorder context linked list; and
   for each of the plurality of reorder contexts, retiring the packet descriptors of the packets assigned to that reorder context based on the order maintained by its associated reorder context linked list and irrespective of the global order.

2. The method of claim 1, further comprising scheduling the processing of the plurality of packets, wherein two or more packets of the plurality of packets are scheduled at the same time.

3. The method of claim 1, further comprising transmitting the plurality of packets to be processed by one or more execution units irrespective of the global order and irrespective of the order maintained by each reorder context linked list.

4. The method of claim 1, further comprising for each processed packet, transmitting the corresponding packet descriptor to be retired irrespective of the global order and irrespective of the order maintained by its reorder context linked list.

5. The method of claim 1, wherein two or more packet descriptors are retired in a single clock cycle at a given time.

6. The method of claim 1, wherein the storing information including packet descriptors representing each of the received packets includes storing that information in one or more reorder buffers.

7. The method of claim 6, wherein each of the plurality of reorder contexts is associated with a different reorder buffer, and wherein the assigning the plurality of packets to different ones of the plurality of reorder contexts includes assigning, for each received packet, a reorder context identifier that identifies the particular reorder context with which that received packet is associated.

8. A network element, comprising:
   an incoming packet classifier unit to receive a plurality of packets in a global order and to assign the plurality of packets to different ones of a plurality of reorder contexts;
   a reorder buffer entry assignment unit coupled with the incoming packet classifier unit, the reorder buffer entry assignment unit including one or more reorder buffers to store the plurality of packets in different ones of the one or more reorder buffers according to the assigned reorder context of each packet, wherein each reorder context is associated with a reorder context linked list which tracks the order in which the packets of each reorder context were received and stored for each respective reorder context;
   an out-of-order processing unit coupled with the reorder buffer entry assignment unit, the out-of-order processing unit including one or more execution units to process the stored packets irrespective of the global order and irrespective of the order as indicated by the reorder context linked lists; and
   a reorder unit coupled with the out-of-order processing unit and the reorder buffer entry assignment unit, the reorder unit including,
      a plurality of reorder buffer entries each including a field to store a link to another one of the reorder buffer entries, wherein each reorder buffer entry is associated with one of the plurality of packets,
      a head and tail pointer storage area to store a head and tail pointer to ones of the plurality of reorder buffer entries for each of the reorder context linked lists, and
      a retirement scheduler unit to schedule retirement of the packets based on the order in which the packets of each reorder context were received and stored for each respective reorder context.

9. The network element of claim 8, wherein the incoming packet classifier unit is to assign a reorder context identifier to that packet which identifies the reorder context that packet belongs, and wherein each of the plurality of reorder contexts is associated with a different reorder buffer.

10. The network element of claim 8, wherein more than one packets are retired during a single clock cycle.

11. The network element of claim 8, wherein the plurality of reorder buffer entries further includes a field to indicate whether a write is pending for the one of the plurality of packets associated with that reorder buffer entry.

12. The network element of claim 8, wherein the plurality of reorder buffer entries further includes a field to indicate whether the same reorder buffer entry address for the one of the plurality of packets associated with that reorder buffer entry is to be reused for one or more derivative packets.

13. The network element of claim 8, further comprising the reorder buffer entry assignment unit to provide the packets to the out-of-order processing unit irrespective of the global order and irrespective of the order in which the packets of each reorder context were received and stored for each respective reorder context.

14. The network element of claim 13, wherein the reorder buffer entry assignment unit is to provide more than one of the packets to the out-of-order processing unit in a single clock cycle.

15. A machine-readable storage medium that provides instructions, which when executed by a machine, cause the machine to perform operations for out-of-order processing, the operations comprising:
  receiving a plurality of packets in a global order;
  assigning the plurality of packets to different ones of a plurality of reorder contexts;
  storing information including packet descriptors representing each of the received packets;
  for each of the plurality of reorder contexts, maintaining a reorder context linked list that tracks the order in which those packets assigned to that reorder context and currently stored were received relative to the global order;
  processing the plurality of packets irrespective of the global order and irrespective of the order maintained by each reorder context linked list; and
  for each of the plurality of reorder contexts, retiring the packet descriptors of the packets assigned to that reorder context based on the order maintained by its associated reorder context linked list and irrespective of the global order.

16. The machine-readable storage medium of claim 15, further comprising scheduling the processing of the plurality of packets, wherein two or more packets of the plurality of packets are scheduled at the same time.

17. The machine-readable storage medium of claim 15, further comprising transmitting the plurality of packets to be processed by one or more execution units irrespective of the global order and irrespective of the order maintained by each reorder context linked list.

18. The machine-readable storage medium of claim 15, further comprising for each processed packet, transmitting the corresponding packet descriptor to be retired irrespective of the global order and irrespective of the order maintained by its reorder context linked list.

19. The machine-readable storage medium of claim 15, wherein two or more packet descriptors are retired in a single clock cycle at a given time.

20. The machine-readable storage medium of claim 15, wherein the storing information including packet descriptors representing each of the received packets includes storing that information in one or more reorder buffers.

21. The machine-readable storage medium of claim 20, wherein each of the plurality of reorder contexts is associated with a different reorder buffer, and wherein the assigning the plurality of packets to different ones of the plurality of reorder contexts includes assigning, for each received packet, a reorder context identifier that identifies the particular reorder context with which that received packet is associated.

\* \* \* \* \*